Feb. 25, 1964

G. H. BALDING 3,122,607

SYMBOL GENERATOR CIRCUIT

Filed Dec. 17, 1962

INVENTOR
GEORGE H. BALDING

AGENT

United States Patent Office 3,122,607
Patented Feb. 25, 1964

3,122,607
SYMBOL GENERATOR CIRCUIT
George H. Balding, Fremont, Calif., assignor, by mesne assignments, to the United States of America as represented by the Secretary of the Navy
Filed Dec. 17, 1962, Ser. No. 245,333
6 Claims. (Cl. 178—6)

The present invention relates to a symbol generator and more particularly to a command speed error symbol generator providing a symbol for use with a video display.

With the advent of high speed aircraft, increasingly complex instrumentation systems for use therein have become necessary. Such instrumentation systems so heavily burden aircraft pilots with routine flight matters as to seriously affect their efficiency in carrying out a specific mission. Thus, it is apparent that a single display system integrating all information concerning aircraft attitude, heading, speed relative position with respect to a target, etc. is vital. At the same time it is also necessary to present this information in a single integrated display whereby continuous representation of true world conditions are displayed which enable a pilot to orient the aircraft to its proper flight mode with respect to earth by reliance solely on the artificial display before him. Such a system is disclosed by application Serial No. 16,438 having the same inventor as the present invention. Another symbol generator circuit, Serial No. 240,188, filed November 26, 1963, is adapted for use with the above system.

The present invention is concerned with the generation of a command speed error symbol which is basically comprised of a small triangle and a horizontal bar for display on a television type screen similar to that disclosed in the above-mentioned application. More specifically, the present invention contemplates an electronic circuit for generating signals representative of a small horizontal bar and a small triangle which when fed into the video path of a display unit similar to that disclosed in the above-mentioned application form a horizontal bar and a small triangle on the screen thereof. The position of the small triangle on the screen may be made to represent the command speed at which the aircraft should be flying and the small horizontal bar may be made to represent the actual speed of the aircraft. The relative position of the two symbols will then indicate to the pilot deviations from the command speed. In other words, the horizontal bar will just touch the tip of the triangle when the aircraft is flying at the command speed but on deviation from the command speed the horizontal bar changes vertical position relative to the triangle. This change in position then indicates in what direction the pilot must change aircraft speed to align the symbols and in so doing correct aircraft speed deviations from the command speed.

The details of the particular unit for displaying the command speed error signal form no part of the present invention. However, it is pointed out that such a display unit may comprise a cathode ray tube whereon the horizontal bar and small triangle symbols are formed. The display on the face of the cathode ray tube is then detected by a vidicon camera and thence the symbol is displayed on a television type screen.

The present invention contemplates an electronic symbol generator circuit wherein a signal representative of a horizontal bar is generated simultaneously with a signal representative of a triangle. Both of these signals are then fed into the video path of a display unit for viewing by the pilot. The triangular symbol is displayed on a television type screen at a specified location indicative of a command speed of the aircraft. The triangular symbol may be centered on the screen by changing or varying the circuit parameters of the particular electronic generator circuit. Once having been positioned on the screen, the triangular symbol is caused to remain stationary while the horizontal bar deviates from its central position in accordance with the actual speed of the aircraft.

Since the present invention is concerned primarily with the electronic circuitry for generating the signals representative of a particular symbol, the particular manner or circuit arrangement which causes the horizontal bar to change its vertical position in accordance with actual speed of the aircraft will not be disclosed. It is pointed out, however, that the control of the relative position of one component part of the symbol with respect to the other may be effected by a computer in the aircraft which computes the speed error by comparing the command speed and the actual speed inputs.

In general, the present invention contemplates a pulse forming circuit which generates two separate trains of differently shaped pulses at a particular rate of recurrence (horizontal rate of 15,750 c.p.s.). One of these pulse chains is fed as an input to a first gate or "and" circuit while the other train of pulses is fed to a second gate or "and" circuit. Each gate circuit is gated at the same rate (vertical rate of 60 c.p.s.). Since each gate circuit has an output only when both signals are present, any particular portion of the pulses in the pulse chains generated at the horizontal rate may be provided as an output from each gate circuit. Furthermore, occurrence of such outputs are in effect simultaneous because the gate circuits are gated at the same rate.

Therefore, it is an object of the present invention to provide an electronic generator circuit for generating signals representative of a horizontal bar and a small triangle for display as a horizontal bar and a small triangle on the screen of a television type display unit which are relatively movable according to deviation of the aircraft from a command speed.

A further object of the present invention is to provide an electronic generator for providing two associated symbols which are movable to different related positions on a common display indicative of speed of an aircraft relative to a command speed.

Another object of the present invention is to provide an electronic circuit for generating a first signal representative of a square wave at the same rate as the first signal in accordance with instantaneous relative speed of the aircraft.

Other objects and features of the invention will become apparent to those skilled in the art as the disclosure is made in the following detailed description of a preferred embodiment of the invention as illustrated in the accompanying drawings in which.

Figure 1:
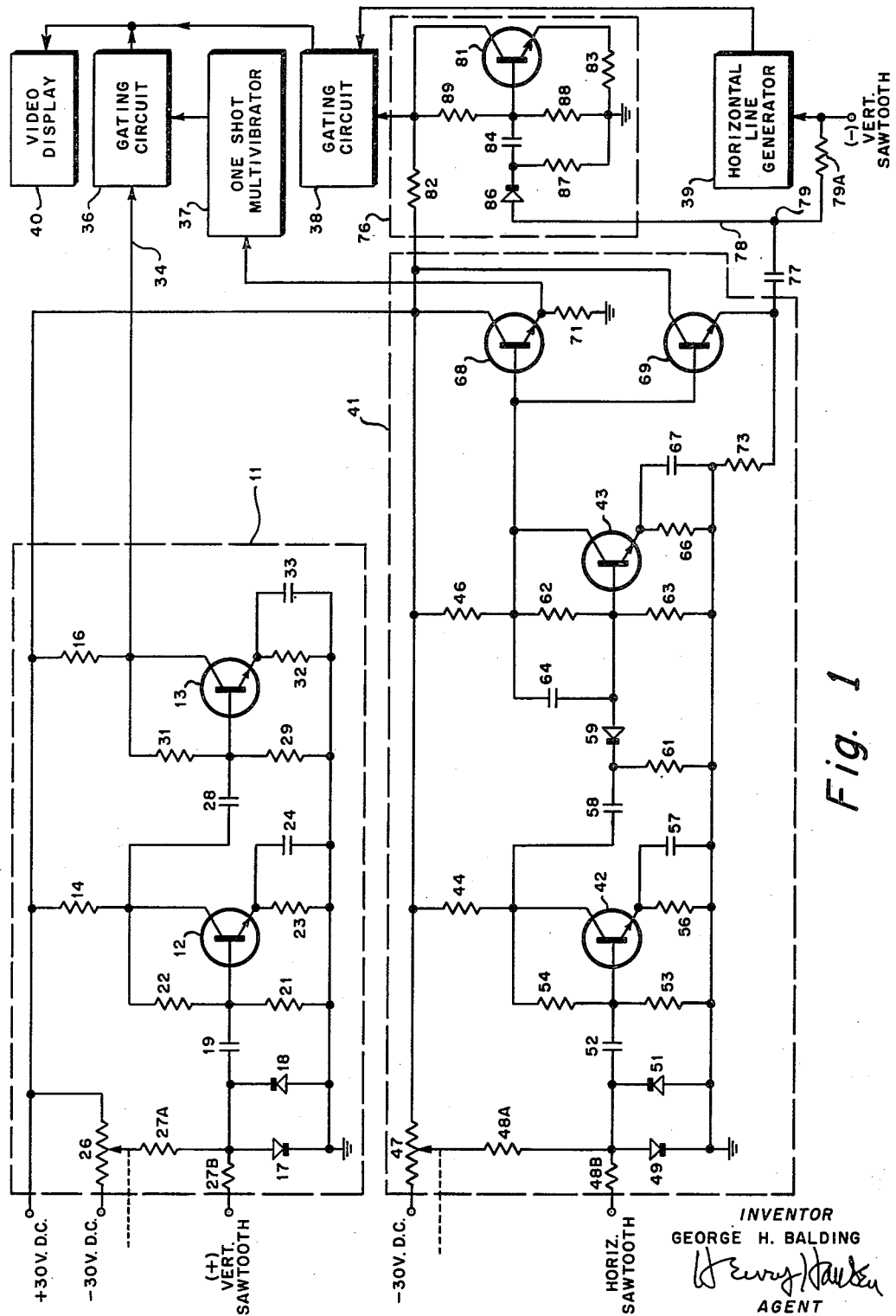
FIG. 1 illustrates partly in schematic and partly in block diagram form the preferred embodiment of the invention.

Referring now more particularly to FIG. 1, there is shown a horizontal line generator 11 enclosed by dotted lines. Horizontal line generator 11 comprises transistors 12 and 13. The collectors of transistors 12 and 13 are connected to a positive D.C. voltage source through resistors 14 and 16, respectively. The base of transistor 12 is connected over resistor 27B to a source of positive vertical sawtooth pulses which occur at a rate of 60 c.p.s. Connected between the sources of positive vertical sawtooth pulses is a clipping circuit comprising diodes 17 and 18 and a differentiating circuit comprising capacitor 19 and resistor 21. Resistor 22 is connected between the collector and the base of transistor 12. Connected between ground and the emitter of transistor 12 are a resistor 23 and capacitor 24 connected in parallel which form an emitter biasing network. Connected between the positive D.C. voltage source and a negative D.C. voltage source is a resistor 26 which together with adjustable wiper arm 27 forms a potentiometer. Arm 27 is connected over resistor 27A and capacitor 19 to the base of transistor 12, and mechanical linkage connected to speed sensor means, not shown, adjusts position of arm 27 with speed of the aircraft.

The base of transistor 13 is connected to the collector of transistor 12 through capacitor 28 which together with resistor 29 forms another differentiating circuit. Resistor 31 is connected between the base and the collector of transistor 13 as shown. Resistor and capacitor 32 and 33 are connected in parallel between the emitter of transistor 13 and ground in a manner similar to resistor and capacitor 23 and 24. The output from pulse former 11 which is taken off of the collector of transistor 13 is connected via conductor 34 to gating circuit 36.

Dotted lines enclose a pulse forming network 41 which generates a pulse having a triangular configuration. The collectors of transistors 42 and 43 are connected to the positive source of D.C. voltage through resistors 44 and 46, respectively. Resistor 47 is connected between a negative D.C. voltage source and the positive D.C. voltage source. Resistor 47 together with wiper arm 48 forms a potentiometer. The opposite end of arm 48 is connected to the base of transistor 42 over resistor 48A and capacitor 52.

A source of horizontal sawtooth pulses is connected over resistor 48B to the base of transistor 42 through clipping circuit comprising diodes 49 and 51 and differentiating circuit comprising capacitor 52 and resistor 53, all connected as shown. A resistor 54 is connected between the base and the collector of transistor 42. Resistor 56 is connected in parallel with capacitor 57 between the emitter of transistor 42 and ground.

The base of transistor 43 is connected to the collector of transistor 42 through capacitor 58 and diode 59. A resistor 61 connects the common point of connection of capacitor 58 and diode 59 to ground. A resistor 62 is connected between the collector and the base of transistor 43 while resistor 63 is connected between the base of transistor 43 and ground. The capacitor 64 is connected between the collector and the base of transistor 43 in parallel with resistor 62. A resistor and capacitor arrangement 66 and 67 similar to resistor and capacitor arrangement 56 and 57 is connected between the emitter of transistor 43 and ground.

The base of transistor 68 is connected directly to the collector of transistor 43 while the collector of transistor 68 is connected to the positive source of D.C. voltage. A resistor 71 connects the emitter of transistor 68 to ground. A conductor 72 connects the emitter of transistor 68 to one shot multivibrator 37. The base of transistor 69 is connected to the base of transistor 68 and the collector of transistor 69 is connected to the collector of transistor 68. The emitter of transistor 69 is connected to ground through resistor 73.

The emitter of transistor 69 is connected to the input of clipper or mixer circuit 76 hereinafter referred to as mixer circuit 76 via capacitor 77 and conductor 78. Horizontal line generator 39 which is identical to generator 11 except that the capacitor 19 is omitted from generator 39, is connected over resistor 79A to a source of negative vertical sawtooth pulses which serve as an input thereto. The same source of negative vertical sawtooth pulses is also connected as an input to mixer circuit 76 via conductor 78. The negative vertical sawtooth pulses mix with the output from transistor 69 at junction 79. Horizontal line generator 39 has an output connected to gating circuit 38. The output terminals of gating circuits 36 and 38 are connected in common to the video path input of a television type display unit (not shown).

Mixed circuit 76 comprises a transistor 81 having its collector connected to gating circuit 38 to provide the second input thereto. The collector of transistor 81 is also connected to the positive D.C. voltage source through load resistor 82 while the emitter of transistor 81 is connected to ground through resistor 83. The base of transistor 81 is connected to conductor 78 through capacitor 84 and diode 86. Resistors 87 and 86 connect respective sides of capacitor 84 to ground as shown. Resistor 89 is connected between the collector and base of transistor 81.

When a positive vertical sawtooth pulse enters pulse generator circuit 11, it is clipped by diodes 17 and 18, differentiated by differentiating circuit comprising capacitor 19 and resistor 21, and amplified by transistors 12 and 13. The output of transistor 13 is a vertical square pulse that occurs at the vertical rate which is the standard 60 c.p.s. This pulse serves as one input to gating circuit ("and" circuit) 36.

The setting on potentiometer 26 which varies with the speed of the aircraft determines the time during the vertical frame at which the transistor 12 conducts to initiate generation of the square wave output pulse. The duration of this output pulse is determined by the value of the components of differentiating circuit 19 and 21.

Gating circuit 36 receives its second input from one shot multivibrator 37 which is a pulse about 5 microseconds long and which occurs at the horizontal rate of 15,750 c.p.s. The output of the gating circuit 36 is then coupled as shown into the path video of video display unit 40 which causes a short horizontal bar to be displayed on the screen. One shot multivibrator 37 is triggered by a pulse from the emitter of transistor 68 which is a sharp, positive, triangular wave.

The manner in which pulse forming circuit 41 forms the triangular wave which triggers one shot multivibrator 37 and which also is combined with the negative vertical sawtooth pulse at junction 79 is discussed hereinbelow.

When a horizontal sawtooth pulse is applied as an input to pulse former circuit 41, it is clipped by diodes 49 and 51, differentiated by differentiating circuit comprising capacitor 52 and resistor 53, and amplified by transistor 42. The output at the collector of transistor 42 is a square pulse which is further shaped into a triangular wave shape occurring at the horizontal rate. As aforesaid, this triangular-shaped wave is used to trigger one shot multivibrator 37 and also is provided as an output from transistor 69 to be mixed with the sawtooth signal occurring at the vertical rate.

If this triangular-shaped waveform which occurs at the horizontal rate were applied by itself to circuit 76 wherein it is amplified to saturation, mixer circuit 76 would have an output comprising a series of square pulses, the width of the square pulses being dependent on the bias level of the original waveform and the location in the horizontal line trace being determined by the setting of potentiometer 47. If these pulses were displayed on a monitor raster, they would cause a vertical bar having a height of the full length of the screen and having a width proportional to the bias level on transistor 81 to be displayed. Thus, if this bias level is made to vary as a function of a particular vertical scan rate, the width of the bar also varies as a function of that scan rate. Therefore, in order to generate the display triangle, the width of the bar must be reduced from a maximum at the bottom of the screen to zero near the middle of the screen. This procedure is repeated with each successive vertical scan in order to produce a stable pattern. In order to vary the bias from a minimum to maximum level, the triangular pulse form from transistor 69 is mixed with the negative vertical sawtooth occurring at the vertical rate previously mentioned when fed into mixer circuit 76. Therefore, when the combined values of the vertical sawtooth and the triangular pulse exceed the established bias level for transistor 81, the input waveforms to transistor 81 are amplified to saturation and there is provided in the output of mixer circuit 76 a series of pulses of progressively narrower width as the trace proceeds from the bottom towards the top of the display.

If these pulses were applied to a cathode ray tube, a triangle with its apex at the center of the screen and its base at the bottom of the screen would be formed thereon. The negative sawtooth pulse changes the width of the vertical pulse bar at a linear rate thus producing a well formed triangle.

Horizontal line generator 39 provides a horizontal pulse to gating circuit 38 at the horizontal rate. This pulse respectively blanks out all but the desired portion of the triangle to be displayed. The output of gating circuit 36 and 38, one the triangle and the other the horizontal black bar, is mixed and is fed into video display unit 40.

Figure 2:
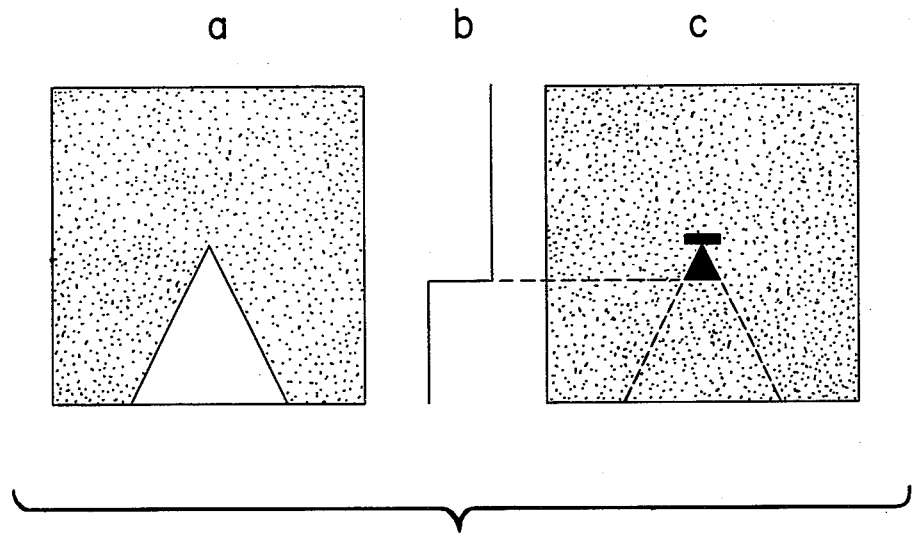
FIG. 2 illustrates the relationship between the triangular and vertical pulses to form a small triangle on a display screen.

FIG. 2 illustrates the pulse relationship for obtaining a small triangular pattern on a display screen similar to a display unit used in the above-cited application. Illustration A of FIG. 2 shows the triangular configuration that would be obtained or displayed on a screen utilizing the output from mixer circuit 76 without any blanking pulse. However, because the output from circuit 76 is fed into a gating circuit that has an output only when the horizontal blanking pulse from horizontal line generator 39 is present, the entire lower portion of the triangle is blanked out before display on the screen. Illustration C of FIG. 2 represents a small triangle as it appears on the screen of a television type display.

The vertical position of the bar may be varied by varying the position of potentiometer arm 27 horizontal line generator 11 which, of course, may be varied in proportion to actual speed of the aircraft. The horizontal position of the bar and triangle may be varied by varying the potentiometer arm 48 which may be used to center the symbol on the screen. Horizontal line generator 39 includes potentiometer means (not shown) similar to that of horizontal line generator 11 for varying the vertical position of the triangle in accordance with the speed at which it is desired to fly. This would be used to position the triangle in a stationary position on the screen which would be representative of a command speed at which it is desired to fly the aircraft. Deviation of the bar with respect to the triangle in a vertical direction would, of course, indicate deviation of the actual speed of the aircraft from the command speed.

Obviously, many modifications and variations of the present invention are possible in the light of the above teachings. It is, therefore, to be understood that within the scope of the appended claims the invention may be practiced otherwise than as specifically described.

What is claimed is:

1. In an electronic symbol generator: first gate circuit means, first pulse forming means providing a triangular shaped pulse output occurring at a first predetermined rate, multivibrator means connected between said first pulse forming means and said first gate circuit means, second pulse forming means connected to said first gate circuit means providing a gate pulse output occurring at a second predetermined rate for gating said first gate circuit means, second gate circuit means, a source of negative vertical sawtooth pulses, mixer circuit means, first means connecting said source of vertical sawtooth pulses and the output of said second pulse forming means to said mixer means, second means connecting the output of said mixer circuit means to said second gate circuit means, third pulse forming means connected to said second gate circuit means providing a gate pulse output occurring at said second predetermined rate for gating said second gate circuit means, video display means, output terminal means commonly connecting said first and second gate circuit means to said video display means.

2. In an electronic symbol generator: first means providing a square pulse output of predetermined duration, second means providing a blanking pulse, first gate circuit means connected to said first and second means having as an output a predetermined portion of said square pulse, third means providing a triangular shaped pulse output, a source of negative sawtooth pulses, fourth means connected to said third means and said source of negative sawtooth pulses providing a series of pulses of progressively narrower width, fifth means providing a blanking pulse, second gate circuit means connected to said fourth and fifth means having as an output a predetermined portion of said series of pulses, video display means, output terminal means connected between said first and second gate circuit means and said video display means coupling the respective outputs of said first and second gate circuit means to said video display means.

3. In an electronic symbol generator: first pulse forming means providing a square pulse output occurring at a first predetermined rate and having a predetermined duration, second pulse forming means providing a blanking pulse occurring at a second predetermined rate, first gate circuit means connected to said first and second pulse forming means having as an output a predetermined portion of said square pulse, third pulse forming means providing a triangular shape pulse output occurring at said first predetermined rate, multivibrator means connected between said third pulse forming means and said first gate circuit means, a source of negative sawtooth pulses, mixer circuit means connected to said third pulse forming means and said source of negative sawtooth pulses providing a series of pulses of progressively narrower width, fourth pulse forming means providing a blanking pulse occurring at said second predetermined rate, second gate circuit means connected to said mixer circuit means and fourth means having as an output a predetermined portion of said series of pulses, video display means, output terminal means connected between said first and second gate circuit means and said video display means coupling the respective outputs of said first and second gate circuit means to said video display means.

4. In a symbol generator according to claim 1 wherein said mixer circuit means comprises: transistor amplifier means, first conductor means connecting said source of negative sawtooth pulses and said first pulse forming means to the base of said transistor amplifier means, second conductor means connecting the collector of said transistor amplifier means to said second gate circuit means, whereby amplification to saturation of the resultant waveform at said first conductor means provides a series of pulses of progressively narrower widths to said second gate circuit means.

5. In a symbol generator according to claim 3 wherein said mixer circuit means comprises: transistor amplifier means, first conductor means connecting said third pulse forming means and said source of negative sawtooth pulses to the base of said transistor amplifier means, second conductor means connecting the collector of said transistor amplifier to said second gate circuit means, whereby amplification to saturation of the resultant waveform at said first conductor means provides a series of pulses of progressively narrower widths to said second gate circuit means.

6. Each and every novel feature and combination of novel features present in or possessed by the apparatus herein disclosed.

No references cited.